(12) United States Patent
Holmes et al.

(10) Patent No.: US 6,372,009 B1
(45) Date of Patent: Apr. 16, 2002

(54) METHOD FOR REDUCING CO AND VOC'S IN STEELMAKING FURNACE OFF-GAS STREAM WITHOUT FORMING OR EXHAUSTING UNDESIRABLE PRODUCTS

(75) Inventors: Ronald L. W. Holmes, Aliquippa; Frank A. Hultgren, Evans City, both of PA (US)

(73) Assignee: Kvaerner Metals, Pittsburgh, PA (US)

( * ) Notice: Subject to any disclaimer, the term of this patent is extended or adjusted under 35 U.S.C. 154(b) by 0 days.

(21) Appl. No.: 09/378,067

(22) Filed: Aug. 20, 1999

(51) Int. Cl.[7] ............................................... C22B 4/00
(52) U.S. Cl. ..................... 75/10.36; 75/10.38; 75/381; 75/414; 75/468; 75/496; 431/4; 431/5
(58) Field of Search .................. 75/414, 381, 10.36, 75/10.38, 496, 468; 431/5, 4

(56) References Cited

U.S. PATENT DOCUMENTS

| | | |
|---|---|---|
| 1,897,750 A | 2/1933 | Brassert |
| 3,592,630 A | 7/1971 | Willett ........................... 75/60 |
| 4,040,819 A | 8/1977 | Rounds ........................... 75/60 |
| 4,156,102 A * | 5/1979 | Mainot et al. ............. 75/10.34 |
| 4,483,832 A * | 11/1984 | Schirmer .................... 423/210 |
| 4,983,362 A | 1/1991 | Obermiiller ................. 422/173 |
| 4,988,285 A * | 1/1991 | Delano ........................... 431/5 |
| 5,413,621 A * | 5/1995 | Hogner et al. ................. 75/376 |
| 5,562,438 A * | 10/1996 | Gordon et al. ............... 431/115 |
| 5,601,424 A * | 2/1997 | Bernstein et al. ............... 431/4 |
| 5,999,556 A * | 12/1999 | Haissig ........................... 373/9 |
| 6,030,204 A * | 2/2000 | Breen et al. .................... 431/4 |

FOREIGN PATENT DOCUMENTS

| JP | 195510 | 5/1985 |
|---|---|---|
| JP | 094196 | 11/1985 |

* cited by examiner

Primary Examiner—Roy King
Assistant Examiner—Tima McGuthry-Banks
(74) Attorney, Agent, or Firm—Armstrong, Westerman & Hattori, LLP

(57) ABSTRACT

A process and apparatus for continuously reducing carbon monoxide (CO), uncombined free hydrogen ($H_2$) and volatile hydrocarbons (VOC's) in molten metal refining vessel off-gases without forming undesirable oxides of nitrogen. Off-gases are directed to a reaction chamber wherein CO, $H_2$ and VOC's are oxidized at a controlled temperature and with a controlled quantity of $O_2$ so as to realize substantially total oxidation of gases present with minimized formation of oxides of nitrogen. Volume and energy of treated gases directed for baghouse treatment are reduced in comparison with prior practice.

14 Claims, 1 Drawing Sheet

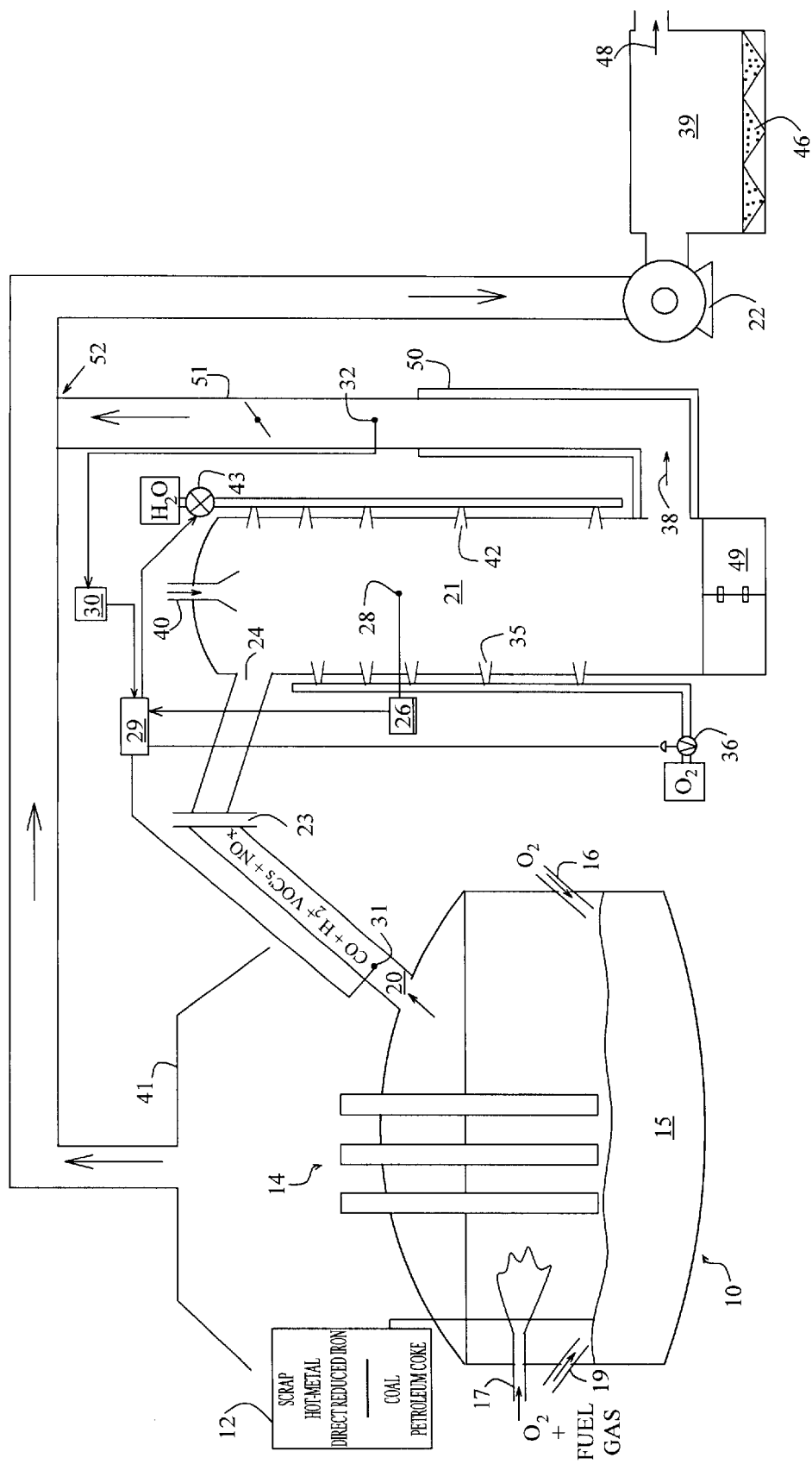

METHOD FOR REDUCING CO AND VOC'S IN STEELMAKING FURNACE OFF-GAS STREAM WITHOUT FORMING OR EXHAUSTING UNDESIRABLE PRODUCTS

BACKGROUND OF THE INVENTION

1. Field of the Invention

This invention relates to a method for minimizing formation of oxides of nitrogen, while substantially eliminating carbon monoxide, hydrogen and volatile hydrocarbons in the off-gas stream of a molten metal refining vessel. The volume and energy of resultant gases are minimized to facilitate subsequent pollution control processing.

2. Description of Related Art

Increasing environmental concerns and regulations, in combination with melting and refining vessels utilizing operating procedures to increase production, lower operating costs and improving product quality, necessitate providing improved apparatus and methods for controlling environmental pollutants associated with off-gases from such melting and refining vessels.

Carbon monoxide (CO), resulting from chemical reactions within the refining vessel is of major environmental concern. Volatile hydrocarbons (VOC's) are also of environmental concern especially in operations wherein the furnace charge contains undesirable high levels of plastic, paint, and/or other organic matter. Uncombined free hydrogen ($H_2$) is also of concern, mainly because of its potentially explosive property. Quantities of some of such off-gases are increased when energy for heating and melting is increased by addition of various forms of fossil fuels such as oxygen-fuel gas through burners in the vessel, inclusion of coal and/or petroleum coke with the vessel charge or injection of coal or graphite into the molten bath.

Elimination of such gaseous pollutants, by prior practice pollution reducing means which are operated at elevated temperatures, forms oxides of nitrogen (NOx) which are also of environmental concern and subject to air quality regulation.

Prior practice methods and apparatus for controlling emissions of undesirable gases include combusting CO-containing off-gases from an oxygen steel converter by the induction of ambient air to such off-gases in a hood of the converter, followed by quenching resultant gases removed from the hood, as described in U.S. Pat. No. 3,592,630; contacting off-gases of a basic oxygen furnace with oxygen, in a hood above the opening of the furnace, to oxidize the CO, while also contacting the off-gases with a stream of air or steam to increase the turbulence of the gases, as described in U.S. Pat. No. 4,040,819; and an apparatus for controlled after burning of process exhaust gas wherein fresh air and "purified process exhaust gas" are introduced into the process gas to control temperature of the gas and the concentration of oxidizable substances, described in U.S. Pat. No. 4,983,362. Although, such prior art recite apparatus and methods for reducing CO emissions, a method is not found for minimizing formation of NOx while lowering the volume and energy of exhausted gases.

SUMMARY OF THE INVENTION

The present invention provides a system to substantially eliminate CO, $H_2$ and VOC's from the off-gas stream of a molten metal refining furnace or vessel while minimizing formation of NOx during such elimination process. Practice of the invention significantly minimizes both volume and energy of resultant exhaust gases thereby lowering the volume of diluting ambient air added before baghouse treatment. Such practice decreases total gas flow to the baghouse as compared with prior practice hence reducing total emitted solids.

Molten metal refining furnace and vessel off-gases are directed to a reaction chamber having an injection system for oxidizing and cooling agents, temperature and gas-composition measurement apparatus, and controls for metering injection of agents such as: atomized water and pure oxygen or dry compressed air, which act as mixing agents as well, into the chamber so as to substantially maintain a selected temperature range for oxidation reactions and to control input of pure $O_2$ or compressed air within a predetermined-volume- range.

Reaction temperature of gases within the reaction chamber is controlled within a narrow range to promote substantially complete oxidation of CO, $H_2$ and VOC's while deterring formation of NOx. Injected quantities of dry compressed air or pure $O_2$ are closely controlled so as to limit the volume of exhausted gases and further suppress chemical formation of NOx, when compressed air is injected as the source of $O_2$. The evolution of the off-gases, change in volume and composition throughout the refining process and the treatment is continuous and changing to meet the demands.

Other specific features and contributions of the invention are described in more detail with reference being made to the accompanying drawing.

BRIEF DESCRIPTION OF THE DRAWING

In the drawing:

FIG. 1 is a schematic drawing of an electric arc furnace, a reaction chamber and related apparatus of the invention for describing gaseous chemical reactions to control environmental pollutants from molten metal refining vessel off-gases.

DETAILED DESCRIPTION OF THE INVENTION

The present invention is disclosed using an electric arc steelmaking furnace as an example. Application of the invention to other molten metal refining vessels and processes such as a Basic Oxygen Furnace (BOF) or an Argon-Oxygen Decarbonization unit (AOD) are not to be ruled out by such example. Any vessel, wherein oxidization occurs and CO is formed, can benefit from application of the invention, including non-ferrous processes.

An electric arc steelmaking furnace and accompanying air pollution control equipment of the invention are schematically depicted in FIG. 1. An electric arc furnace generally depicted at 10 is presented for describing material and energy input to the furnace and off-gas composition resulting from the steelmaking process carried out in the furnace. Other steelmaking methods, mentioned above, produce greater or lesser amounts of the off-gases to be described below and can benefit from application of the present invention. A basic oxygen furnace, for example, produces greater amounts of CO. Material input, depicted at 12, comprises steel scrap selected so as to meet the chemical specification of the product heat. Additional material input can include: liquid hot metal, for example, from operation of a blast furnace or smelting furnace and/or direct-reduced iron (DRI) processed from iron ore.

In the present example, heat for melting such charged material is provided by arc heating through contact of electrodes 14 with furnace contents 15 and heat associated with electrical arcs from the energized electrodes. Introduction of $O_2$ above and through the surface of the molten material, at injectors such as 16 and 17, provides additional heat to the furnace as an exothermic chemical reaction combining oxygen with carbon to produce carbon monoxide or carbon dioxide takes place.

To increase furnace productivity by decreasing "tap to tap" time, electrical power to the electrodes can be increased, however, there are physical and electrical limits to such practice. Other means to increase productivity include oxygen-fuel gas, such as natural gas, introduced at sidewall burners such as 17 and/or the addition of carbon as contained in coal, petroleum coke, or other fossil fuels, added with furnace charge 12. Coal or other fossil fuels can also be injected into the furnace bath, as depicted at injector 19. Such addition of fossil fuels generates additional energy within the furnace, however, it also increases the volume and temperature of off-gases and can increase $H_2$ and CO to the off-gases. Volatile hydrocarbons, resulting mainly from plastics and paints included with the metal scrap, include any hydrocarbon which can be burned to produce CO, $CO_2$ and $H_2O$. Operation of the furnace to increase productivity as described above, requires additional pollution control means to handle the increased volume of gases, increased temperature of gases and increased presence of VOC's, as compared with operation without such energy enhancing means.

Off-gases exit the furnace through flue 20 for treatment in reaction chamber 21. Furnace off-gases are drawn into and out of chamber 21 with use of fan 22 which also maintains the furnace at a negative pressure in relation to atmospheric pressure. Reaction chamber 21, presents a cross sectional area substantially greater than that of the furnace flue which results in a significant decrease in gas velocity within the chamber so as to promote a more complete reaction of the gases while within the chamber. A reaction chamber having a diameter 3 to 5 times that of the flue diameter can reduce gas velocity so as to attain such complete reaction. In a preferred embodiment the combustion chamber is located immediately downstream from the furnace fourth hole break flange indicated schematically at 23 in FIG. 1. Such location is known in the art and is so named because the flue is associated with a fourth hole in the furnace roof. The first three holes are provided for the three electrodes (14). Conditions within reaction chamber 21, with practice of the invention, promote substantially complete oxidation of CO, VOC's and uncombined free hydrogen while substantially eliminating the formation of oxides of nitrogen (NOx) when air is injected as a source of $O_2$. Such conditions include controlling temperature of reactions within the chamber and controlling $O_2$ available for such reactions.

Steelmaking furnace off-gases, made up primarily of CO, uncombined free $H_2$, NOx's and VOC's enter reaction chamber 21 at inlet 24. NOx's are present as they are formed in the head space of the furnace from $N_2$ which enters the furnace through unavoidable openings in the furnace. Ambient air containing $N_2$ also enters the system through the fourth hole break flange.

Temperature sensor 26 having probe 28 within the chamber inputs temperature data to process controller 29. CO sensor 30 having probe 31 upstream of the chamber, and probe 32 downstream of the chamber, inputs CO gas data to process controller 29. Such controller can consist of a programmable logic computer (PLC).

Injection of an oxidizer such as $O_2$ or air into the chamber through high-energy high velocity injectors 35 is regulated by valve 36, such as a servovalve, controlled by process controller 29. Introduction of $O_2$ is limited to an amount slightly above that stoichiometrically determined to be necessary for combining with CO to form $CO_2$ and $H_2$ to form $H_2O$. Such excess $O_2$ is needed for combining with the VOC's which are present in the furnace off-gases. In one embodiment of the invention, $O_2$ is introduced as solely $O_2$ gas and in an alternate embodiment $O_2$ is introduced as a component of injected compressed air. Such injection compressed air is substantially free of moisture as a result of the process for compressing ambient air. Introduction of solely $O_2$ gas reduces the total volume of resultant gases exiting reaction chamber 21 at exit 38 for subsequent treatment at baghouse 39, and eliminates introduction of additional nitrogen into the system. In the alternative, introduction Of $O_2$, as a component of compressed air, introduces additional nitrogen to the system with its potential for forming NOx. By practice of the invention, however, the amount of Nox is increased only slightly with use of injected air. As indicated above, $O_2$ in excess of that required, to combine with CO to form $CO_2$ and $H_2$ to form $H_2O$, is injected into reaction chamber 21 during the off-gas treatment cycle. Such excess is necessary for reacting with VOC's so as to eliminate them from the off-gases. VOC's are at the highest concentration during initial stages of the metal refining cycle. Plastics, paint and other sources of VOC's are often present with metal scrap which makes up a large part of the furnace charge. During furnace charging and initial stages of the metal refining cycle residual heat in the furnace results in formation of such VOC pollutants.

To remove VOC's from the off-gases during such high concentration period, the excess $O_2$ injected into chamber 21 is between about 10–20% above that needed for CO and $H_2$ oxidation as indicated above. During later stages of the refining process, such excess $O_2$ can be reduced to about 2–4% as the presence of VOC's is greatly reduced. During such early stages of metal refining, especially just following furnace charging when the off-gases are not at a temperature at which VOC oxidation readily takes place, burners such as 40, disposed in the reaction chamber, increase the off-gas temperature to at least 1800–2000° F. Use of the burners is not required when the off-gases exiting the furnace reach such temperature range. During furnace charging, canopy 41 captures emitted fumes and particulates for conduction to baghouse 39.

During the metal refining cycle, the temperature within the combustion chamber is controlled to cause oxidation reactions to take place within a temperature range of about 2000–2400° F. which substantially eliminates the formation of oxides of nitrogen (NOx) from nitrogen in the injected compressed air or the other sources of nitrogen. Such temperature range is sufficient to burn the volatile hydrocarbons present in the gas. A temperature of about 2240° F. is an optimum temperature for carrying out the oxidation processes. Higher temperatures increase the formation of NOx, lower temperatures decrease the oxidation of VOC's. A turbulent mixing of gases (described below) is provided in the chamber to promote uniformity of temperature throughout the chamber and promote complete combustion of the gases. Absent turbulent mixing, streamline flow of the high velocity gases through the chamber would prevent total combustion. In the embodiment wherein $O_2$ is provided by injecting compressed air into the chamber, minimizing the amount of compressed air introduced, so as to only provide the amount of $O_2$ stoichiometrically needed, as indicated above, results in the total gas volume exiting the reaction chamber for subsequent treatment at baghouse 39 to be at a low level. Reaction temperature within the chamber is controlled by the introduction of atomized water 42 which is regulated by valve 43, such as a servovalve, controlled by process controller 29. Oxidation reactions to eliminate CO, $H_2$ and VOC's at such controlled decreased temperature, in addition to substantially eliminating production of oxides of nitrogen, reduces the amount of dilution cooling air needed to lower the temperature of gases to an acceptable level prior to entry into baghouse 37. Such dilution cooling air can be introduced through the vent associated with canopy 41. Gases entering the baghouse, in a preferred embodiment, are at a temperature of about 220–260° F. Baghouse 39 separates particulate matter from the gases, as depicted at 46, resulting in treated furnace off-gas 48. In addition to particulate matter removal at the baghouse, large particulate matter is removed from the gas stream by gravity action in reaction chamber 21. Provisions are included for its removal from the chamber at clean out means 49. The hot gases exiting the reaction chamber are partially cooled by passage through water cooled duct 50. When the gases are cooled sufficiently, to about 1200° F., non-water cooled duct 51 is used to direct the gases to a point 52 where they mix with the ambient cooling air from canopy 41 for dilution.

Examples indicating the composition of treated electric arc steelmaking furnace off-gases are tabulated below.

Simultaneous use of a plurality of high-velocity high-energy gas injectors and high-pressure atomized water injectors disposed throughout the reaction chamber promote a turbulent mixing of gases within the reaction chamber and assure substantially complete oxidation of CO, $H_2$ and volatile hydrocarbons at the preferred temperature range and prevent excessive production of oxides of nitrogen. Oxides of nitrogen, from oxidation of nitrogen present in the furnace, are reduced in the combustion chamber to further reduce exhausting NOx to the atmosphere. A gas "residence time" in the chamber of at least one second is preferred for more complete oxidation of the undesirable gases. That is, the average flow velocity of gases through the chamber is such that it takes at least one second, for gas to pass through the chamber. A reaction chamber length of about 30–40 feet provides such residence time for most operations.

Regulation of $O_2$ into the chamber is preferably controlled by process control means 29. Mathematical models of selected electric arc furnace processes are used and requirements for $O_2$, throughout the steelmaking-process, are known. CO gas measurements obtained upstream and downstream of the reaction chamber by sensor 30 and probes 31, 32 verify intended operation of the apparatus and can be utilized to modify $O_2$ injection as part of the process control. Computer models predicting $O_2$ requirements are based on material input, energy input and method of operation of the furnace, all of which are known for each heat prior to processing. $O_2$ requirements for various conditions are predetermined by empirical or mathematical means and maintained in data storage components of process control means 29.

CO, $H_2$ and VOC's evolve from the furnace at varying rates throughout the steelmaking process, with a high rate of VOC evolution during initial stages of the process from impurities in the scrap as discussed above. Such computer models anticipate such changing rates and control $O_2$ injection accordingly.

Table I below, compares information for treated off-gases resulting from use of two different embodiments of the invention, with that of a prior practice operation. A temperature of 3090° F. is assumed for off-gas exit temperature from the furnace. Such temperature is within the temperature range found for off-gases from electric arc furnaces. At such temperature, or at temperatures in the range of about 2240° F.–3320° F., the oxide of nitrogen which is of concern is NO. Other oxides of nitrogen produced at those temperatures are present in quantities of less than one ppm and are not of concern. Table I and II information is calculated using free energy data from National Bureau of Standards thermochemical tables to predict equilibria amounts of CO, $CO_2$, $H_2O$, $H_2$, $O_2$, $N_2$ and NO. The following conditions for furnace operation are assumed for all cases in Table I:

| | |
|---|---|
| Furnace Type | Electric Arc Furnace |
| Furnace Size | 50 Ton Heat Weight |
| Process Time | 55 Minutes Tap to Tap |
| Electrical Power Time | 38 Minutes |
| Additional Energy Source | 35 Pounds of Coal/Ton |
| | ~450 scf $O_2$/Ton |
| Off-Gas Temperature At Furnace | 3090° F. |

The following specific conditions are assumed for three different treatments carried out on the furnace off-gases:

Case 1—(prior practice without reaction chamber) Fourth hole break flange is opened to indraft sufficient ambient air to both oxidize the off-gases and maintain a gas temperature of about 3090° F. Without air in excess of that needed to oxidize the off-gases, the resultant gas temperature would increase above the temperature of the gas exiting the furnace (3090° F.); additional ambient air is indrafted downstream from the fourth hole break flange to dilute and cool resultant gases to between about 250° F. prior to entering the baghouse.

Case 2—Oxidation takes place in the reaction chamber of the invention located immediately downstream from the fourth hole break flange (which is substantially closed except for opening when required for controlling pressure within the furnace); pure $O_2$ gas is injected into the chamber for oxidation; atomized water is injected into the chamber to cause the oxidation reactions to occur at about 2240° F.; the quantity of $O_2$ injected is initially about 20% then reduced to about 2% more than that stoichiometrically required to totally oxidize CO to $CO_2$ and $H_2$ to $H_2O$; ambient air is indrafted downstream from the reaction chamber to dilute and cool gases to about 250° F. prior to entering the baghouse.

Case 3—Same conditions as case 2, with the exception of the source of $O_2$ for injecting into the reaction chamber being compressed air.

Table I information is for total volume of gases from one 50 ton heat of steel processed in an electric arc furnace, measured downstream from the reaction chamber and prior to indrafting dilution air or, in prior practice Case 1, downstream from the fourth hole break flange. Column one is the CO remaining in the off-gas, expressed in lb/ton of steel produced; column two is the NO in the off-gas, expressed in lb/ton of steel produced; column three is the quantity of atomized water required to maintain the preferred reaction temperature, expressed in gallons; column four is the amount of $O_2$ injected into the reaction chamber, expressed in scf; column five is the amount of compressed air injected into the reaction chamber, expressed in standard cubic feet (scf); and column six is the volume of gases exiting the reaction chamber, expressed in actual cubic feet (acf); and column seven is the enthalpy of gas exiting the reaction chamber. The values in column seven are indicative of the amount of additional cooling of the gases that is required before entry into the baghouse.

TABLE I (Without oxy-fuel burners)

|  | CO (lb/ton) | NO (lb/ton) | Injected Atomized Water (Gallon) | Injected $O_2$ (scf) | Injected Compressed Air (scf) | Chamber Exit Volume (acf) | Chamber Exit Gas Enthalpy BTU |
|---|---|---|---|---|---|---|---|
| Case 1 (prior practice) | 0.34 | 2.5 | 0 | 0 | 0 | 2,176,145 | 29,187,000 |
| Case 2 | 0.044 | 0.01 | 646 | 13,444 | 0 | 1,666,253 | 17,906,400 |
| Case 3 | 0.046 | 0.011 | 449 | 0 | 64,173 | 1,761,714 | 18,358,200 |

TABLE II (With Oxy-fuel burners)

|  | CO (lb/ton) | NO (lb/ton) | Injected Atomized Water (Gallon) | Injected $O_2$ (scf) | Injected Compressed Air (scf) | Chamber Exit Volume (acf) | Chamber Exit Gas Enthalpy BTU |
|---|---|---|---|---|---|---|---|
| Case 4 (prior practice) | 0.51 | 2.56 | 0 | 0 | 0 | 2,599,551 | 36,132,824 |
| Case 5 | 0.061 | 0.012 | 735 | 11,991 | 0 | 2,129,665 | 23,366,007 |
| Case 6 | 0.061 | 0.014 | 560 | 0 | 57,238 | 2,212,933 | 23,767,875 |

It can be seen from information in Table I that in comparison with prior practice the process of the invention results in:

1) CO remaining in the furnace off-gas after the oxidation reaction being decreased to less than 14% of the prior practice level;

2) NO in the treated gas being decreased to less than 0.5% as compared with prior practice, by controlling the combustion temperature and reducing the ambient nitrogen present in the reaction chamber.

3) Enthalpy of exit gases from the combustion chamber being decreased by about 37%.

Table II compares information for treated off-gases resulting from use of two different embodiments of the invention, with that of a prior practice system for an electric arc furnace. In all three cases oxygen-natural gas burners provide additional energy to the furnace.

The following conditions for furnace operation are assumed for all cases in the table:

| | |
|---|---|
| Furnace Type | Electric Arc Furnace |
| Furnace Size | 50 Ton Heat Weight |
| Process Time | 55 Minutes Tap to Tap |
| Electrical Power Time | 38 Minutes |
| Additional Energy Source | 35 Pounds of Coal/Ton |
| | ~500 scf $O_2$/Ton |
| | 5–3.5 MegaWatt Oxygen-Natural Gas Burners Operated For 25 Minutes |
| Off-Gas Temperature At Furnace | 3090° F. |

The following specific conditions are assumed for three different treatments of the furnace off-gases:

Case 4—(prior practice without reaction chamber) Fourth hole break flange is opened to indraft sufficient ambient air to both oxidize the off-gases and maintain a gas temperature of about 3090° F.; additional ambient air is indrafted downstream from the fourth hole break flange to dilute and cool gases to about 250° F. prior to entering the baghouse.

Case 5—Oxidation takes place in the reaction chamber of the invention located immediately downstream from the fourth hole break flange (which is substantially closed except for opening as required for controlling pressure within the furnace); pure $O_2$ gas is injected into the chamber for oxidation; atomized water is injected into the chamber to cause the oxidation reactions to occur at about 2240° F.; the quantity of $O_2$ injected is about 20% initially then reduced to about 2% more than that stoichiometrically required to totally oxidize CO to $CO_2$ and $H_2$ to $H_2O$; ambient air is indrafted downstream from the reaction chamber to dilute and cool gases to about 250° F. prior to entering the baghouse.

Case 6—Same conditions as Case 5, with the exception of the source of $O_2$ for injecting into the chamber being compressed air.

Table II information is for total gases from one 50 ton heat of steel from an electric arc furnace, measured downstream from the reaction chamber and prior to indrafting of final dilution air or, in prior practice Case 4, downstream from the fourth hole break flange and prior to indrafting of final dilution air.

Column one is the CO remaining in the off-gas, expressed in lb/ton of steel produced; column two is the NO in the off-gas, expressed in lb/ton of steel produced; column three is the quantity of atomized water required to maintain the preferred reaction temperature, expressed in gallons; column four is the amount of $O_2$ injected into the reaction chamber, expressed in scf; column five is the amount of compressed air injected into the reaction chamber, expressed in scf; column six is the volume of gases exiting the reaction chamber, expressed in acf; and column seven is the enthalpy of gas exiting the reaction chamber.

It can be seen from information in Table II that in comparison with prior practice:

1) CO remaining in the furnace off-gas after the oxidation reaction is decreased to less than 11% of the level found in prior practice;

2) NO in the treated gas is decrease to less than 0.6% of the prior practice level;

(3) Enthalpy of exit gases from the combustion chamber being decreased by about 34%.

While specific temperatures, gases and processing steps have been set forth for purposes of describing embodiments of the invention, various modifications can be resorted to, in light of the above teachings, without departing from applicants' novel contributions; therefore, in determining the scope of the present invention, reference shall be made to the appended claims.

What is claimed is:

1. A method of continuously treating CO and $H_2$ containing off-gases generated by a molten metal refining process for steel occurring in a refining vessel, comprising:

provide a reaction chamber for treating the process off-gases, providing conducting means from the refining vessel to the reaction chamber, conducting the off-gases to the reaction chamber, introducing $O_2$ into the reaction chamber at a rate sufficient to oxidize substantially all the CO and $H_2$ in the off-gases to $CO_2$ and $H_2O$, simultaneously introducing $H_2O$ into the reaction chamber at a rate sufficient to control the temperature within said reaction chamber so as to result in said oxidation reaction occurring within a temperature range of about 2000–2400° F. so as to substantially prevent the formation of oxides of nitrogen within said reaction chamber, and exhausting resultant gases from the reaction chamber which are substantially free of CO, $H_2$, and oxides of nitrogen.

2. The method of claim 1, wherein $O_2$ is injected into the reaction chamber as a component of compressed air, and gases exiting the chamber are substantially free of oxides of nitrogen.

3. The method of claim 1, wherein $O_2$ is injected into the reaction chamber as substantially pure $O_2$ gas.

4. The method of claim 1, wherein $O_2$ is injected into the chamber at a varying rate so as to provide a 2–20% excess over that stoichiometrically required for oxidation of CO to $CO_2$ and $H_2$ to $H_2O$.

5. The method of claim 1, wherein $H_2O$ is injected into the reaction chamber as atomized $H_2O$.

6. The method of claim 1, wherein the reaction chamber capacity provides for an off-gas residence time in the chamber of at least 1 second.

7. The method of claim 1, further comprising: providing means for controlling injection of $O_2$ into the reaction chamber, and controlling the $O_2$ injection with use of a computer model of the molten metal refining process to provide $O_2$ at a rate sufficient to oxidize substantially all the CO in the off-gases to $CO_2$, all the $H_2$ in the off-gases to $H_2O$ and to oxidize any volatile hydrocarbons present in the off-gases.

8. The method of claim 6, further comprising: providing reaction chamber temperature measuring means, measuring the chamber temperature and injecting atomized $H_2O$ in response to said measured temperature so as to maintain the reaction temperature range.

9. The method of claim 8, further comprising:

providing CO sensors, for use in controlling and verifying CO content of gases, at location(s) selected from the group consisting of:
 a. upstream of the reaction chamber,
 b. downstream of the reaction chamber, and
 c. combination of a and b.

10. The method of claim 1, wherein the molten metal refining process comprises a steelmaking process carried out in an electric arc furnace.

11. The method of claim 10, wherein the electric arc furnace steelmaking process includes adding energy to the furnace by the addition of fossil fuels.

12. The method of claim 10, wherein the electric arc furnace steelmaking process includes adding energy to the furnace with use of oxygen-fuel gas burners.

13. The method of claim 1, wherein the molten metal refining process is a steelmaking process, $O_2$ is injected into the reaction chamber as a component of compressed air, and treated off-gases of the molten metal refining process contain:
 NO in the amount of less than 0.02 lb/ton of steel produced, and
 CO in the amount of less than 0.07 lb/ton of steel produced.

14. A method of treating CO, $H_2$ and VOC's containing off-gases of a steelmaking process carried out in an electric arc furnace wherein $O_2$ is injected into the molten metal within the furnace and fossil fuels are provided to increase energy within the furnace, comprising:

providing a reaction chamber for receiving the furnace off-gases, providing conducting means from the furnace to the reaction chamber, conducting the furnace off-gases to the reaction chamber, introducing $O_2$ into the chamber as a component of compressed air at a rate sufficient to oxidize substantially all the CO in the off-gases to $CO_2$, all the $H_2$ to $H_2O$ and to oxidize all the VOC's, simultaneously introducing $H_2O$ into the chamber at a rate sufficient to control the temperature within said reaction chamber so as to result in said oxidation reactions occurring within a temperature range of about 2000–2400° F. so as to substantially prevent the formation of $NO_x$ within said reaction chamber, and exhausting resultant gases from the reaction chamber substantially free of CO, $H_2$, VOC's and $NO_x$.

* * * * *